United States Patent
Ng (10) Patent No.: US 9,200,679 B2
(45) Date of Patent: *Dec. 1, 2015

(54) SLIP CLUTCH FOR ROLLER SHADE

(71) Applicant: Philip Ng, Thornhill, CA (US)

(72) Inventor: Philip Ng, Thornhill, CA (US)

(*) Notice: Subject to any disclaimer, the term of this patent is extended or adjusted under 35 U.S.C. 154(b) by 5 days.

This patent is subject to a terminal disclaimer.

(21) Appl. No.: 13/951,692

(22) Filed: Jul. 26, 2013

(65) Prior Publication Data

US 2014/0110210 A1   Apr. 24, 2014

Related U.S. Application Data

(63) Continuation-in-part of application No. 13/654,872, filed on Oct. 18, 2012.

(51) Int. Cl.
  *F16D 7/02*   (2006.01)
  *F16D 13/12*  (2006.01)
  *F16D 41/20*  (2006.01)

(52) U.S. Cl.
  CPC .............. *F16D 7/021* (2013.01); *F16D 7/022* (2013.01); *F16D 13/12* (2013.01); *F16D 41/206* (2013.01)

(58) Field of Classification Search
  CPC .......... E06B 9/60; F16D 41/206; F16D 13/12

USPC ............ 192/223.4, 81 C; 160/298, 307, 308, 160/291

See application file for complete search history.

(56) References Cited

U.S. PATENT DOCUMENTS

| 5,375,643 | A  | * | 12/1994 | Rude ........................... 160/321 |
| 5,507,374 | A  | * | 4/1996  | Rude ........................ 192/223.4 |
| 6,685,592 | B2 | * | 2/2004  | Fraczek et al. ................ 475/14 |
| 8,556,059 | B2 | * | 10/2013 | Ng et al. ................... 192/223.4 |
| 2010/0243182 | A1 | * | 9/2010 | Ng et al. ....................... 160/297 |
| 2014/0110212 | A1 | * | 4/2014 | Ng ............................... 192/75 |

* cited by examiner

*Primary Examiner* — Colby M Hansen
(74) *Attorney, Agent, or Firm* — Price Heneveld LLP (57) ABSTRACT

A slip cutch for a roller blind that includes a clutch base with a shaft portion, a drive sprocket including a drive tube and rotationally mounted on the clutch base, at least one clutch spring and a roller tube connector. The clutch spring maybe a coil spring frictionally engaged about the shaft portion and positioned between the shaft portion and the drive tube. The spring includes end members that engage the drive tube such that rotation of the drive tube about the shaft portion is resisted by the frictional engagement of the spring about the shaft. The roller tube connector is secured about the drive tube and rotates with the drive tube about the shaft portion. The roller tube connector is free from contact with the clutch spring.

11 Claims, 9 Drawing Sheets

SLIP CLUTCH FOR ROLLER SHADE

CROSS-REFERENCE TO RELATED APPLICATION

This application is a continuation-in-part of U.S. patent application Ser. No. 13/654,872, the entire disclosure of which is hereby incorporated by reference.

FIELD OF THE INVENTION

The invention relates to a slip clutch for a roller shade or roller blind.

BACKGROUND OF THE INVENTION

Roller shades, or roller blinds as they are sometimes referred to, are commonly mounted on windows for privacy purposes and to limit light intrusion. Modern roller shades typically employ a clutch mechanism that permits the shade to be raised and lowered through pulling on one end of a looped chain or cord and that is received around the clutch. The clutch serves as a mechanism to impart rotational movement to the roller tube of the blind when the chain or cord is pulled in one direction or the other. Typically, the clutch is also utilized to retain the roller tube in a locked position when a desired amount of fabric has been unrolled therefrom. That is, in some instances it will be desirable to "lower" the shade such that its fabric covers the entire window, while in other instances it may be desirable to only over the upper portion of the window. In either case, once the desired amount of fabric has been unrolled from the roller tube, the clutch assists in maintaining the tube in position without winding or unwinding more fabric until the operator again applies tension to one end of the cord or chain.

The clutch mechanism of a roller shade or blind therefore allows for clockwise or counter clockwise rotation of the roller tube upon the application of tension to the blind's cord or chain, while maintaining the tube in position when no, or insufficient, tension is applied. Since the clutch is an integral component of the roller shade, there is a constant need to improve the clutch in order to enhance the experience and operational options available to a user when lowering the shade.

SUMMARY OF THE INVENTION

The invention therefore provides a slip clutch for a roller blind, the slip clutch comprising a clutch base, said clutch base including a shaft portion; a drive sprocket rotationally mounted on said clutch base, said drive sprocket engageable with a chain or cord to impart rotational movement to said drive sprocket, said drive sprocket including a drive tube axially receivable about at least a portion of said shaft portion of said clutch base; a roller tube connector operatively associated with said drive tube such that said roller tube connector and said drive tube generally rotate together about said shaft portion, at least one clutch spring, said clutch spring in the form of a coil spring frictionally engagable about said shaft portion of said clutch base and positioned generally between said shaft portion and said drive tube, said clutch spring including end members wherein, either each of said end members are independently engagable with said drive tube or one of said end members is engagable with said drive tube and one of said end members is engagable with said roller tube connector, such that rotation of said drive tube about said shaft portion is initially resisted by the frictional engagement of said clutch spring about said shaft portion; rotational force imparted to said drive sprocket causing either said drive tube or said roller tube connector to apply a force to one of said end members of said clutch spring in a direction that encourages an increase in the diameter of said spring to reduce the frictional engagement of said clutch spring with said shaft portion and to permit rotation of said drive tube and said roller tube connector about said shaft portion.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

Figure 1:
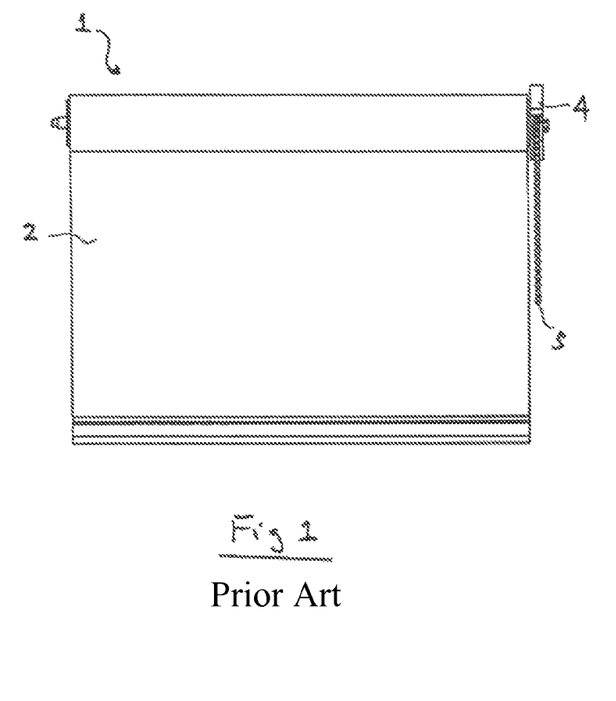
FIG. 1 is a side elevational view of a typical roller shade having its end brackets removed.
Figure 2:
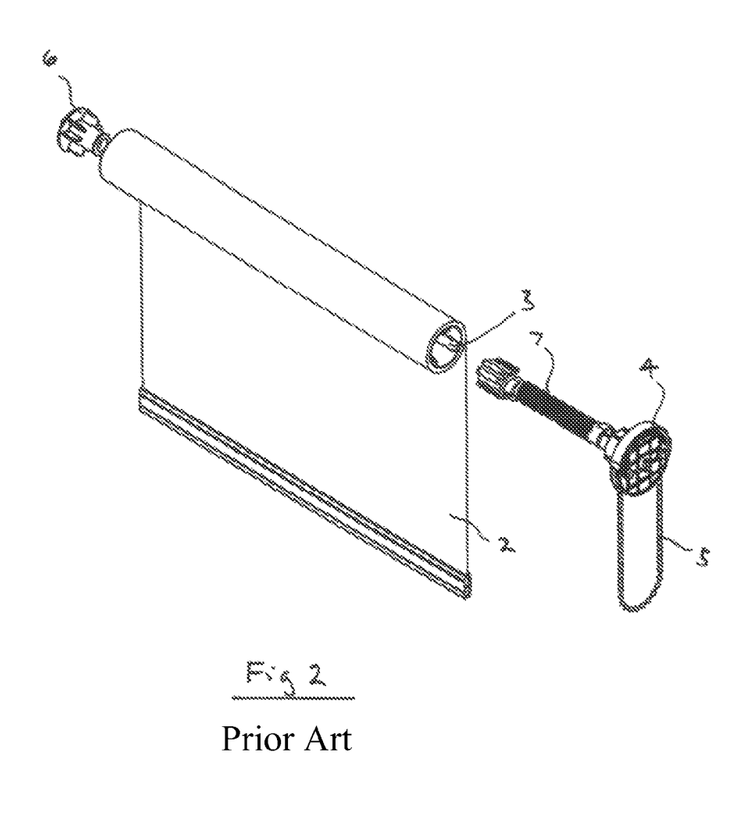
FIG. 2 is an exploded side perspective view of the roller shade of FIG. 1.
Figure 6:
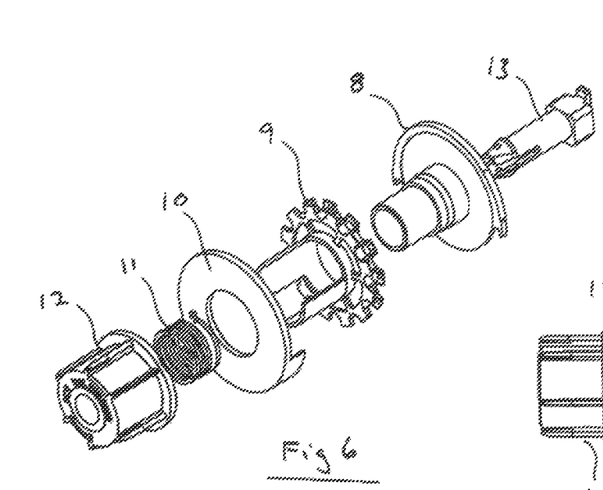
FIG. 6 is a side perspective exploded view of the slip clutch in accordance with an embodiment of the present invention.
Figure 7:
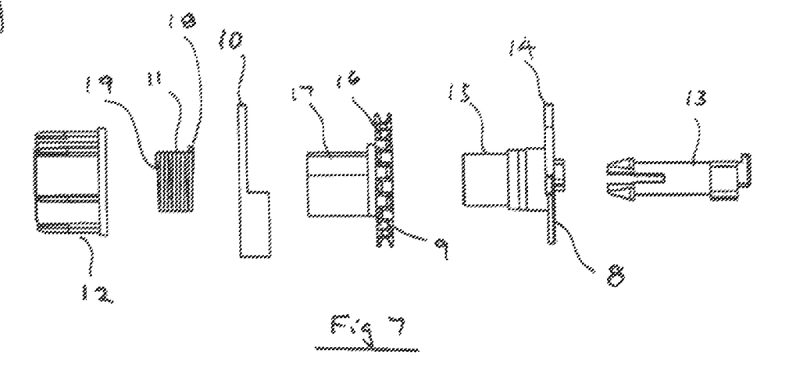
FIG. 7 is a side elevational view of FIG. 6.

FIG. 1 shows, in general, a typical roller blind roller shade 1 having been removed from its end brackets. Roller blind 1 includes blind fabric 2 received over a roller tube 3 that is driven by a clutch mechanism 4 activated by a chain or cord 5. In FIG. 2 there is shown the idler end connector 6 of roller tube 3 and a typical spring assist mechanism 7 as would commonly be used in many roller blinds. Clutch 4 is a slip clutch that permits the rotation of roller tube 3 in order to wind or unwind fabric thereabout, but that also prevents rotation of the tube when a desired amount of blind fabric has been received on the roller tube or has been lowered downwardly over the window. Referring to FIGS. 6 and 7 there is shown in exploded view an embodiment of slip clutch 4 constructed in accordance with the invention. Here, slip clutch 4 is generally comprised of a clutch base 8, a drive sprocket 9, a sprocket cover 10, a clutch spring 11, and a roller tube connector 12. When assembled, each of the above mentioned parts nest together in a generally coaxial configuration and are received about a locking pin 13, which serves to maintain the components in their desired position.

With reference again to FIGS. 6 and 7, clutch base 8 can be seen as including a rear pate portion 14 and a shaft portion 15. Shaft portion 15 preferably has a hollow bore for receiving locking pin 13. Drive sprocket 9 includes a drive wheel or cog 16 that is designed to receive a chain or cord that is used to impart rotational movement to the sprocket. Connected to the drive wheel or cog is a drive tube 17. Drive sprocket 9 is rotationally mounted upon clutch base 8 through the receipt of shaft portion 15 within drive tube 17. Sprocket cover 10 is then received over drive tube 17 and engages rear pate 14 of the clutch base in order to form an interior pocket or cavity that receives and retains the chain or cord.

Figure 8:
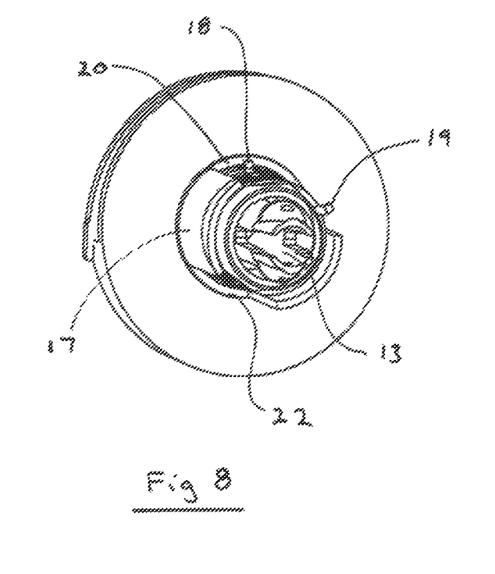
FIG. 8 is an upper end perspective view of the slip clutch shown in FIG. 6 in its assembled form.
Figure 9:
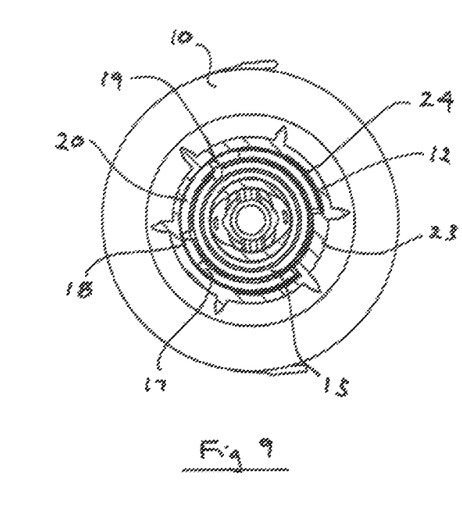
FIG. 9 is an inner end view of the slip clutch shown in FIG. 8 with the roller tube connector shown in section.
Figure 10:
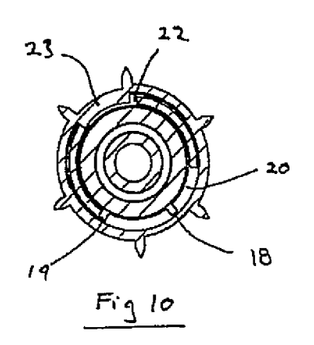
FIG. 10 is a view of the inner end of the slip clutch of FIG. 9 showing the positioning and configuration of the components of the clutch during counter clockwise rotation.
Figure 11:
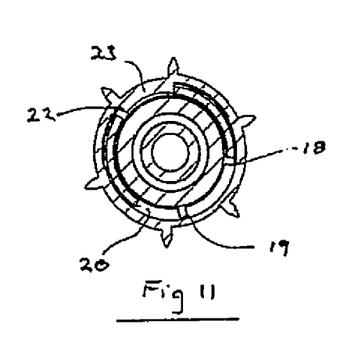
FIG. 11 is a view similar to FIG. 10 showing the components and configuration of the clutch during clockwise rotation.
Figure 12:
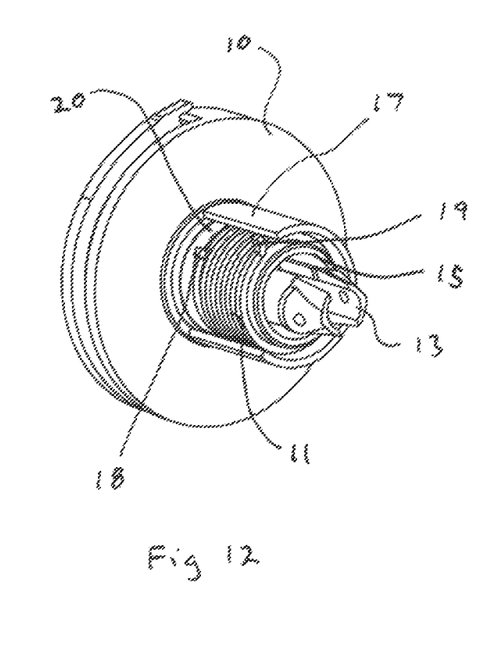
FIG. 12 is an upper end perspective view of an alternate embodiment of the slip clutch.

Clutch spring 11 is preferably in the form of a coil spring that is received about the exterior surface of shaft portion 15 and that is frictionally engaged therewith, As shown in the attached drawings, and more particularly in FIGS. 8 and 9, drive tube 17 and shaft portion 15 are dimensioned such that clutch spring 11 is positioned between the shaft portion and the drive tube. Further, clutch spring 11 includes a pair of end members, 18 and 19, respectively, that engage drive tube 17 such that rotation of the drive tube about the shaft portion is resisted by engagement of end members 18 and 19 with drive tube 17 and by the frictional engagement of the clutch spring about shaft portion 15.

In the embodiment of the invention shown, the engagement of end members 18 and 19 with dove tube 17 is achieved through the formation of a first axially oriented skit 20 within the exterior of drive tube 17. End members 18 and 19 will thus be comprised of upwardly and outwardly bent ends that extend at approximately right angles from the surface of shaft portion 15. The distance between end members 18 and 19 is such that it is less than the width of the opening of first axial slot 20 so that rotation of the drive tube will result in engagement of the drive tube with only one of end members 18 and 19 at any one particular time. Further, the winding of the cods of clutch spring 11 are preferably in a direction that causes the drive tube to apply a force to the clutch spring (through the engagement of one of ends 18 or 19 with an edge of sot 20) in a direction that encourages an increase in the diameter of the spring. That is, the windings are such that when one side or edge of first axial slot 20 engages one of end members 18 or 19, further rotation of the drive tube will have a tendency to "open" the clutch spring, which will encourage an increase in the diameter of the spring, thereby reducing its frictional engagement with shaft portion 15. That is, through the application of a rotational force to the drive sprocket (by means of pulling on one end of the chain or cord received thereabout) first axial slot 20 will be caused to contact one of end members 18 and 19. The frictional engagement of the clutch spring with shaft portion 15 will resist movement of the drive sprocket until such time as the force applied to the sprocket is able to overcome the frictional engagement of the clutch spring.

The ends of the clutch spring and the sides of first axial slot 20 are such that the application of a rotational force to the clutch spring, through operation of the chain or cord, exhibits a tendency to reduce the frictional engagement of the clutch spring upon shaft portion 15 (by "opening" the spring), thereby making rotation of the clutch (and, as will be explained below, the roller tube) easier for the operator. Since the width of first axial slot 20 is greater than the spacing between end members 18 and 19, rotation of drive sprocket 9 in either direction will enable only one of the end members to be contacted by the drive tube at any one time. In that manner, rotation of the drive sprocket in either a clockwise or counter clockwise direction will enable an "opening" force to be applied to the clutch spring regardless of whether it is desired to lift or lower the blind fabric.

Figure 3:
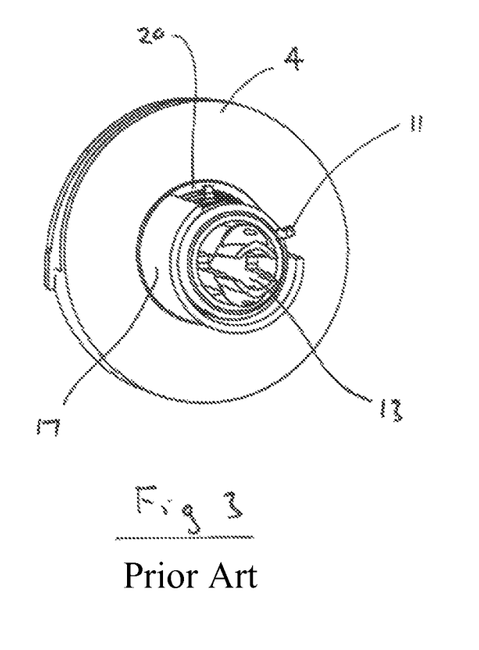
FIG. 3 is an upper side perspective view of a slip clutch constructed in accordance with the prior art.
Figure 4:
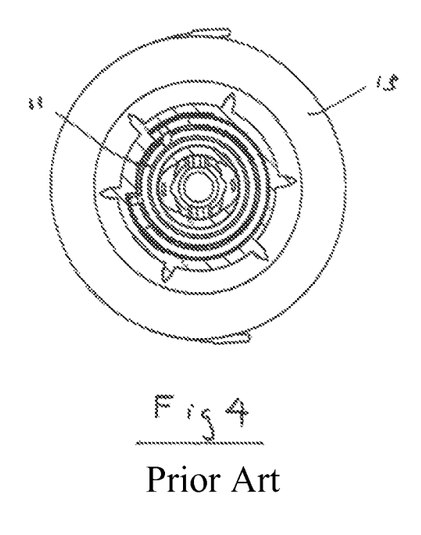
FIG. 4 is an end view of the clutch shown in FIG. 3.
Figure 5:
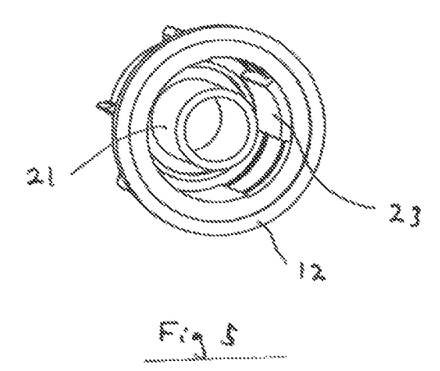
FIG. 5 is an end perspective view of the roller tube housing connector of the roller shade.

With specific reference to FIGS. 5 through 9, roller tube connector 12 is shown as having a generally hollow interior that is received about the exterior surface of drive tube 17. A centrally positioned hollow tube portion 21 extends through roller tube connector 12 and is received through shaft portion 15 of the clutch base to ensure coaxial alignment of the various components, and to permit the receipt of locking pin 13 therethrough. In this embodiment roller tube connector 12 is secured to drive tube 17 in a manner that prevents contact between the roller tube connector and the clutch spring. The means of connecting roller tube connector 12 to the drive tube 17 so that the roller tube connector is free from contact with the clutch spring is through the formation of a second axially oriented slot 22 within drive tube 17. Second slot 22 receives a tab 23 that is positioned upon the interior surface of roller tube connector 12 such that the roller tube connector and the drive tube are effectively locked together and rotate in unison. Such a structure that locks the roller tube connector and the drive tube together in the described manner is a significant departure from existing clutches as prior clutches (see FIGS. 3 and 4) permit contact between the roller tube connector and the cutch spring. In prior clutches, tab 23 is positioned between spring end members 18 and 19 and results in the application of force to the spring in a direction that has a tendency to squeeze or contract the diameter of the clutch spring, thereby tending to increase the frictional contact between the spring and the shaft portion of the clutch base, effectively making the clutch a "non-slip" clutch.

It will thus be appreciated and understood that in light of the above described structure there will be no application of a force to the clutch spring which would otherwise have a tendency to increase the frictional contact between the spring and shaft portion 15 of clutch base 8.

In most embodiments it is expected that roller tube connector 12 will be formed from a form of plastic, fiberglass, polycarbonate or other generally similar material. Accordingly, in order to enhance the strength and rigidity of tab 23 the tab itself may be formed form a metal or metal-like material or, alternatively, the tab may be covered with a metal plate or clip. Further, in one of the preferred embodiments of the invention the interior surface of drive tube 17, with the exception of that portion that has been removed to form first axial slot 20, may be encased by a metallic bushing 24. The ends of bushing 24 preferably extend around the edges of first axial slot 20 to present a strong and rigid edge surface against which end members 18 and 19 of clutch spring 11 can bear. That is, in many instances it is expected that the drive sprocket and its drive tube will be formed from a plastic or other similar material. Accordingly, through the incorporation of a metal bushing having edges that encompass the sides of first axial slot 20, the tendency for end members 18 and 19 of the clutch spring to deform the edges of first axial slot 20 eliminated or significantly reduced. Bushing 24 also prevents unintended contact between tab 23 and clutch spring 11 that could possibly occur (for example, if there were a significant twisting or side load applied to the roller tube).

In a further embodiment of the invention (not shown) two or more clutch springs may be utilized. The incorporation of multiple clutch springs may be particularly advantageous in situations where the load to be borne by the clutch is significant, as would be the case in long blinds or blinds that incorporate heavy fabrics.

From a thorough understanding of the invention it will be appreciated that slip clutch 4 presents the ability to prevent rotational movement of a roller tube when desired. When an operator wishes to rotate the roller tube for purposes of ether unrolling fabric or rewinding the fabric upon the roller tube, pulling the drive chain or cord in either direction will result rotational force being imparted to drive sprocket 9. In the embodiment of FIGS. 6-11, as the drive sprocket rotates, one of the longitudinal edges of first axial slot 20 will contact one of the ends 18 and 19 of clutch spring 11. With clutch spring 11 frictionally engaged about shaft portion 15, the application of the rotational force to one of end members 18 or 19 of the clutch spring will have a tendency to apply an "opening" force to the spring. The result will be a reduction in the frictional engagement between the spring and the shaft portion, which will allow the drive sprocket (and the roller tube connector) to be rotated and the blind fabric to be wound or unwound from the roller tube. With the roller tube connector 12 being free from contact with the clutch spring, there is no friction enhancing force applied to the clutch spring which would otherwise make rotating the drive sprocket more difficult and require the individual to pull significantly harder on the cord or chain. Once the chain or cord is released, the force tending to "open"s the spring is removed, causing the spring to contract to its rest configuration and effectively locking the clutch, and the roller tube, in position.

Similarly, from an understanding of the described structure it will be understood that, unlike in the case of traditional clutches, the slip clutch of the present invention will also permit an operator to "lower" the blind (ie unwind fabric from the roller tube) through merely grasping the bottom bar or bottom of the fabric and pulling downwardly. Whereas in the case of a traditional clutch pulling on the bottom of the fabric will have little or no effect (unless sufficient force was applied to damage the clutch), through use of the above described slip clutch, pulling on the bottom of the fabric will result in roller tube connector 12 applying a rotational force to drive tube 17 that will tend to "open" the clutch spring, facilitating rotational movement of the roller tube and an unwinding of the fabric. Hence the slip clutch of the present invention provides an operator with the added advantage of being able to lower the blind fabric through merely grasping the bottom of the fabric and pulling in a downward direction. That result is accomplished through the use of a structure that is not only robust and durable, but that has relatively consistent torque requirements throughout its operation, again unlike many traditionally available clutches.

Clutch 4 may be constructed in a manner where its internal friction is such that the clutch effectively works together with spring assist mechanism 7 to generally "balance" the weight of the blind fabric. That is, the fabric unwound from the roller tube will generally be held by the spring assist mechanism with the slip clutch helping to balance the torque difference between torque generated by the blind fabric and that generated by the spring assist. In this way, the amount of force needed to be applied via the drive chain or cord, or through pulling downwardly on the blind fabric, is minimized and relatively consistent.

Figure 13:
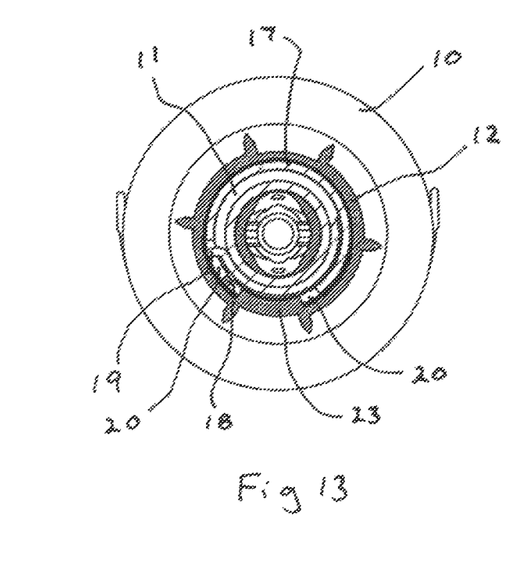
FIG. 13 is an inner end view of the slip clutch shown in FIG. 12 with the roller tube connector shown in section.
Figure 14:
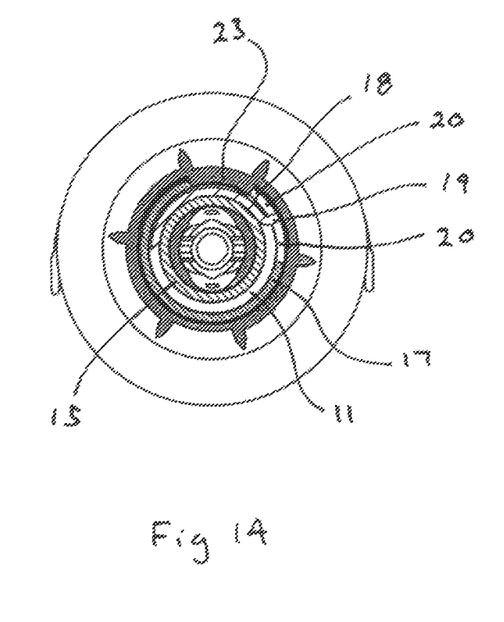
FIG. 14 is a view of the inner end of the slip clutch of FIG. 13 showing the components and configuration of the clutch during clockwise rotation.
Figure 15:
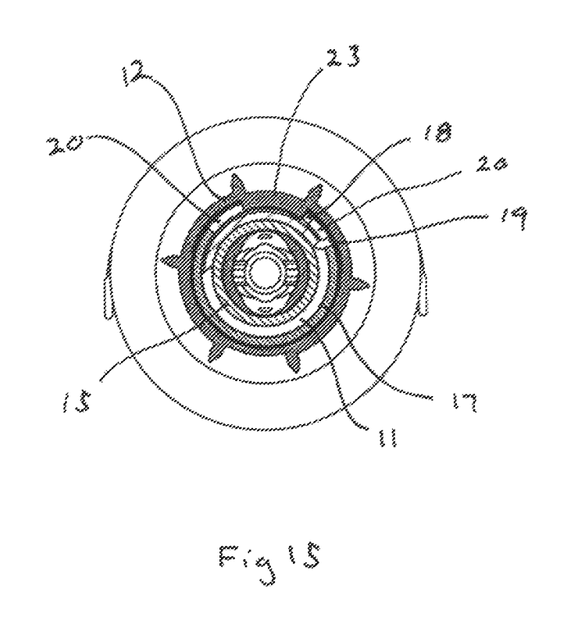
FIG. 15 is a view similar to FIG. 14 showing the components and configuration of the clutch during counter clockwise rotation.

FIGS. 13 through 15 show an alternate embodiment of the invention. In this embodiment drive tube 17 contains a single axial slot 20. Tab 23 of roller tube connector 12, as well as each of end members 18 and 19 of clutch spring 11, are received with axial slot 20. The direction of rotation of clutch spring 11 is such that tab 23 is received circumferentially to the left (i.e. counter clockwise) to each of end members 18 and 19 of clutch spring 11 (see FIG. 13). Otherwise, the embodiment shown in FIGS. 12 through 15 is generally the same as that shown in FIGS. 6 through 11.

With respect to the operation of the embodiment shown in FIGS. 12 through 15, it will be appreciated from an understanding of the structure and upon review of the drawings, that a clockwise rotation of drive tube 17 (see FIG. 14) will cause the left hand edge of the first axial slot 20 in the drive tube to contact tab 23 of roller tube connector 12. Further clockwise rotation of the drive tube will then cause the roller tube connector to rotate clockwise until the opposite side of tab 23 contacts end member 18 of clutch spring 11, applying an "opening" force to the clutch spring and encouraging an increase in the diameter of the spring thereby reducing its frictional engagement with shaft portion 15. The reduced frictional engagement between the spring and the shaft portion will permit the roller tube connector (and the roller tube attached thereto) to rotate in a clockwise direction. When the rotational force applied to drive tube 17 is stopped (or reduced to below that necessary to "open" the spring) the spring will contract and the reduction in the frictional engagement between the spring and the shaft portion will be diminished to the point where rotation of the roller tube connector will cease and the roller tube will effectively be locked in position.

FIG. 15 shows the scenario where drive tube 17 is rotated in a counter clockwise direction, opposite to the situation shown in FIG. 14. Here, as the roller tube is rotated counter clockwise, the right hand edge of first axial slot 20 will contact and member 19 of clutch spring 11, having a tendency to "open" the clutch spring (by encouraging an increase in the diameter of the spring) thereby reducing its frictional engagement with shaft portion 15. The spring will then rotate about shaft portion 15 until second end member 18 contacts tab 23 of roller tube connector 12. The spring is wound such that the contact between second end member 18 and tab 23 will maintain the spring in an "open" configuration. Further rotation of the drive member and the spring in a counter clockwise direction will cause a counter clockwise rotation of the roller tube connector and the roller tube attached thereto. As in the situation described above with respect to FIG. 14, when the counter clockwise force applied to the drive tube is reduced (or diminished to a level below that required to keep the spring "open"), the spring will contract and the frictional engagement between the spring and shaft portion 15 will be such that the components of the clutch will once again be locked in position. Further rotation of the roller tube connector and the roller tube will then be restricted or prevented.

It will thus be understood and appreciated that the embodiment shown in FIGS. 12 through 15, while functioning much the same as the embodiment shown in FIGS. 6 through 11 presents a manufacturing advantage in that only a single axial slot 20 is required to be formed within drive tube 17.

It is to be understood that what has been described are the preferred embodiments of the invention. The scope of the claims should not be limited by the preferred embodiments set forth above, but should be given the broadest interpretation consistent with the description as a whole.

The invention claimed is:

1. A slip clutch for a roller blind of the type having blind fabric wound upon a roller tube, the slip clutch comprising:
   a clutch base, said clutch base including a shaft portion;
   a drive sprocket rotationally mounted on said clutch base, said drive sprocket engageable with a chain or cord to impart rotational movement to said drive sprocket, said drive sprocket including a drive tube having an interior, said drive tube axially receivable about at least a portion of said shaft portion of said clutch base;
   a roller tube connector having an interior received about at least a portion of said drive tube such that said roller tube connector and said drive tube generally rotate together about said shaft portion,
   at least one clutch spring, said clutch spring comprising a coil spring frictionally engagable about said shaft portion of said clutch base and positioned generally between said shaft portion and said drive tube, said clutch spring including end members wherein, either each of said end members are independently engagable with said drive tube or one of said end members is engagable with said drive tube and one of said end members is engagable with said roller tube connector, such that rotation of said drive tube about said shaft portion is initially resisted by the frictional engagement of said clutch spring about said shaft portion;
   wherein rotational force imparted to said drive sprocket causing either said drive tube or said roller tube connector to apply a force to one of said end members of said clutch spring in a direction that encourages an increase in the diameter of said spring to reduce the frictional engagement of said clutch spring with said shaft portion and to permit rotation of said drive tube and said roller tube connector about said shaft portion, and
   wherein rotational force applied to said roller tube connector in a direction tending to unwind blind fabric from the roller tube causes said roller tube connector to apply a rotational force to said drive tube causing said drive tube to apply a force to one of said end members of said clutch spring in a direction that encourages an increase in the diameter of said spring to reduce the frictional engagement of said clutch spring with said shaft portion thereby permitting rotation of said drive tube and said roller tube connector about said shaft portion and an unwinding of blind fabric from the roller tube.

2. The slip clutch as claimed in claim 1 wherein removal of said rotational force imparted to said drive sprocket results in a decrease in the diameter of said clutch spring and an increase in the frictional engagement of said spring with said shaft portion, thereby causing said spring to resist rotation of said drive tube and said roller tube connector about said shaft portion.

3. The slip clutch as claimed in claim 2 wherein said end members of said clutch spring independently engage said drive tube, and wherein said roller tube connector is free from contact with said clutch spring.

4. The slip clutch as claimed in claim 2 wherein said drive tube contains an axial slot for receiving said end members of said coil spring.

5. The slip clutch as claimed in claim 4 wherein said roller tube connector is received axially about at least a portion of an exterior surface of said drive tube, said interior of said roller tube connector including a tab receivable within said axial slot.

6. The slip clutch as claimed in claim 5 wherein one of said end members of said clutch spring received within said axial slot is engagable with said drive tube and one of said end members received within said axial slot is engagable with said roller tube connector.

7. The slip clutch as claimed in claim 6 wherein said tab is metal or has a metal covering.

8. A slip clutch for a roller blind of the type having blind fabric wound upon a roller tube, the slip clutch comprising:
   a clutch base, said clutch base including a shaft portion;
   a drive sprocket rotationally mounted on said clutch base, said drive sprocket engageable with a chain or cord to impart rotational movement to said drive sprocket, said drive sprocket including a drive tube having an interior, said drive tube axially receivable about at least a portion of said shaft portion of said clutch base;
   a roller tube connector having an interior received about at least a portion of said drive tube such that said roller tube connector and said drive tube generally rotate together about said shaft portion,
   at least one clutch spring, said clutch spring comprising a coil spring frictionally engagable about said shaft portion of said clutch base and positioned generally between said shaft portion and said drive tube, said clutch spring including end members wherein, either each of said end members are independently engagable with said drive tube or one of said end members is engagable with said drive tube and one of said end members is engagable with said roller tube connector, such that rotation of said drive tube about said shaft portion is initially resisted by the frictional engagement of said clutch spring about said shaft portion;
   wherein rotational force imparted to said drive sprocket causing either said drive tube or said roller tube connector to apply a force to one of said end members of said clutch spring in a direction that encourages an increase in the diameter of said spring to reduce the frictional engagement of said clutch spring with said shaft portion and to permit rotation of said drive tube and said roller tube connector about said shaft portion,
   said roller tube connector is received axially about at least a portion of an exterior surface of said drive tube, said drive tube including a first axial slot for receiving said end members of said coil spring, said drive tube including a second axial slot, said interior of said roller tube connector including a tab receivable within said second axial slot to permit said roller tube connector to generally rotate together with said drive tube about said shaft portion.

9. The slip clutch as claimed in claim 8 wherein said tab is metal or has a metal covering.

10. The slip clutch as claimed in claim 8 including a bushing received about the interior of said drive tube, said bushing preventing said tab of said roller tube connector from contacting said clutch spring, said end members of said clutch spring engaging said bushing to prevent impingement of said end members within said drive tube.

11. The slip clutch as claimed in claim 10 wherein said bushing is metal.

* * * * *